United States Patent
Saunamaki et al.

(10) Patent No.: US 10,666,083 B2
(45) Date of Patent: *May 26, 2020

(54) TECHNIQUES FOR WIRE-FREE CHARGING

(71) Applicant: INTEL CORPORATION, Santa Clara, CA (US)

(72) Inventors: Esa Saunamaki, Virrat (FI); Marko Bonden, Nokia (FI)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/178,874

(22) Filed: Nov. 2, 2018

(65) Prior Publication Data

US 2019/0074707 A1 Mar. 7, 2019

Related U.S. Application Data

(63) Continuation of application No. 15/279,368, filed on Sep. 28, 2016, now Pat. No. 10,122,204.

(51) Int. Cl.
*H02J 7/00* (2006.01)
*H02J 7/02* (2016.01)
*H02J 50/05* (2016.01)
*H02J 50/10* (2016.01)
*H04B 5/00* (2006.01)
*H02J 50/70* (2016.01)

(52) U.S. Cl.
CPC ............. *H02J 7/025* (2013.01); *H02J 50/05* (2016.02); *H02J 50/10* (2016.02); *H02J 50/70* (2016.02); *H04B 5/0037* (2013.01)

(58) Field of Classification Search
CPC .. H02J 7/025; H02J 5/005; H02J 50/10; H02J 50/20; H02J 50/60; H02J 50/70; H02J 50/90
USPC .......................................... 320/108
See application file for complete search history.

(56) References Cited

U.S. PATENT DOCUMENTS

| 4,593,409 A | 6/1986 | Miller |
| 2016/0181848 A1 | 6/2016 | Ying et al. |
| 2016/0221441 A1 | 8/2016 | Hall et al. |
| 2017/0187223 A1* | 6/2017 | Hosseini ................ H02J 7/025 |
| 2018/0048193 A1* | 2/2018 | Kovacs .................. H02J 50/20 |

OTHER PUBLICATIONS

European Search Report and Written Opinion for the European Patent Application No. EP17857040, dated Apr. 17, 2020, 6 pages.

* cited by examiner

*Primary Examiner* — Paul Dinh

(57) ABSTRACT

Various embodiments are generally directed to techniques for wire-free charging. Some embodiments are particularly directed to a wire-free charging system that is able to limit or prevent a radio frequency (RF) signal source from interfering with operation of the wire-free charging system, such as, for instance, a transmitter (TX) signal of a cellular device being charged by the wire-free charging system. In some embodiments, a wire-free power source may be able to detect an RF signal source and alter one or more operational parameters of the wire-free charging system to prevent the RF signal source from interfering with operation of the wire-free charging system.

18 Claims, 15 Drawing Sheets

Produce a coupler signal with an RF coupler based on an incident signal in a wire-free power source
702

↓

Identify whether the coupler signal includes a target characteristic with an RF detection circuit
704

↓

Alter an operational parameter of the wire-free power source when the coupler signal includes the target characteristic
706

*FIG. 8*

Storage Medium 800

*Computer Executable Instructions for 700*

TECHNIQUES FOR WIRE-FREE CHARGING

CROSS-REFERENCE TO RELATED APPLICATIONS

This application is a continuation of, claims the benefit of and priority to previously filed U.S. patent application Ser. No. 15/279,368 filed Sep. 28, 2016, entitled "TECHNIQUES FOR WIRE-FREE CHARGING", which has issued as U.S. Pat. No. 10,122,204 on Nov. 6, 2018, which is hereby incorporated by reference in its entirety.

BACKGROUND

Wire-free charging can eliminate the need for wires between a charger and a rechargeable device. Typically, wire-free charging utilizes a charging pad as the power transmitter to deliver the power and a rechargeable device with a built in receiver to receive the power. Charger control circuitry may initiate charging when a valid receiver is identified on the charging pad. Generally, wire-free charging may refer to inductive charging, capacitive charging, and/or conductive charging. Conductive charging may require a physical connection between a rechargeable device and a charger while inductive and capacitive charging may not require a physical connection between a rechargeable device and a charger.

BRIEF DESCRIPTION OF THE DRAWINGS

FIG. 7 illustrates an embodiments of a first logic flow.

FIG. 8 illustrates an embodiment of a storage medium.

DETAILED DESCRIPTION

Figure 1A:
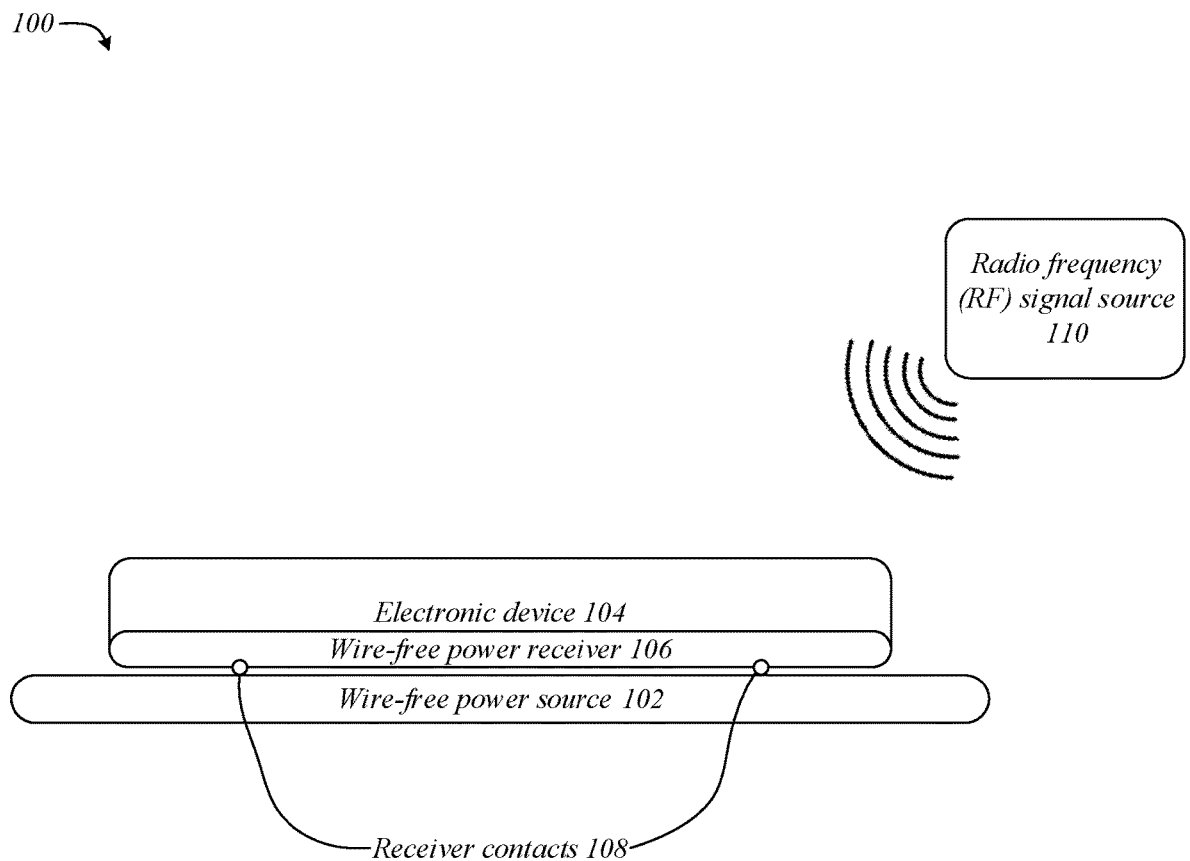
FIG. 1A illustrates an embodiment of a wire-free charging system in conjunction with a separate radio frequency (RF) signal source.

Various embodiments are generally directed to techniques for wire-free charging. Some embodiments are particularly directed to a wire-free charging system that is able to limit or prevent radio frequency (RF) signals from interfering with the operation of a wire-free charging system, such as, for example, a cellular transmitter (TX) signal. In some embodiments, a wire-free power source may be able to detect an RF signal and alter one or more operational parameters of the wire-free charging system to limit or prevent the RF signal from interfering with operation of the wire-free charging system. Various embodiments described herein may include RF analysis circuitry to produce a coupler signal based on an incident signal in a wire-free power source, identify whether the coupler signal includes a target characteristic, and alter an operational parameter of the wire-free power source when the coupler signal includes the target characteristic. For instance, there may be an RF coupler included in a wire-free charging system to produce a coupler signal based on a detected cellular TX signal. The coupler signal may be analyzed to determine information about the cellular TX signal. The determined information about the cellular TX signal may be used to alter one or more operational parameters of the wire-free charging system. In some embodiments, the one or more operational parameters may include one or more of a hardware configuration and a software parameter.

Some challenges facing wire-free charging systems include impractical, inflexible, and inefficient techniques for charging an electronic device. In various embodiments, RF signals may disturb the functionality of a wire-free charging system. For example, a transmitter signal of a cellular device being charged may couple directly from an antenna of the cellular device to the contact stripes or pad of the wire-free charging system and cause false alarms in a safety circuit or otherwise disturb operation of the wire-free charging system. This may cause spurious emissions that may disturb other electrical devices nearby such as a device being charged. In some embodiments, this may be caused by a cellular TX signal mixing with a signal from the wire-free power source. Additionally, antenna currents may flow through the conductive coupling between the cellular phone and the contact stripes, again causing false alarms in the safety circuit or otherwise disturbing operation of the wire-free charging system. Adding further complexity, when an electronic device, such as a cellular phone, is placed on the wire-free charging system, the cellular antenna may be detuned, resulting in a higher than normal TX signal levels. In some embodiments, this may lead to faulty operation of the wire-free charging system. In some embodiments, this may increase levels of spurious emissions, which may lead to situations in which emissions levels are above regulatory radiated spurious emission limits, such as Federal Communications Commission (FCC) or European Conformity (CE) regulations for example. These and other factors may result in a wire-free charging system with poor performance and limited adaptability. Such limitations can drastically reduce the usability and applicability of the wire-free charging system, contributing to inefficient systems with reduced capabilities.

Various embodiments described herein include a wire-free charging system with RF analysis circuitry to efficiently charge an electronic device. The RF analysis circuitry may enable a wire-free charging system to more efficiently charge an electronic device by altering operation of the wire-free charging system based on detection of RF signals that may disturb operation of the wire-free charging system. For example, the RF analysis circuitry may prevent a safety circuit in a wire-free charging system from disconnecting power by causing the wire-free charging system to repeat a safety circuit related detection operation one or more times prior to the safety circuit disconnecting power to ensure that a cellular TX signal did not cause a false alarm in the safety circuit related detection operation. In these and other ways the wire-free charging system may enable robust and efficient wire-free charging to achieve better performing, safer, and more dynamic wire-free charging systems, resulting in several technical effects and advantages.

In various embodiments, the RF analysis circuitry of the wire-free charging system may include an RF coupler and an RF detection circuit. The RF coupler may produce a coupler signal based on an incident signal in a wire-free charging system. In some embodiments, the incident signal may be a spurious emission of a cellular TX signal. In various embodiments, the incident signal or interfering RF signal, can be a cellular TX signal, spurious emission of TX signal, analog or digital transmitter signal or any other interfering RF signal that fulfil one or more target characteristics. The RF detection circuit may receive the coupler signal and identify whether the coupler signal includes a target characteristic. In various embodiments, the target characteristic may indicate that the incident signal is a spurious emission of a cellular TX signal. The RF detection circuit may alter an operational parameter of the wire-free power source when the coupler signal includes the target characteristic.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

Figure 1B:
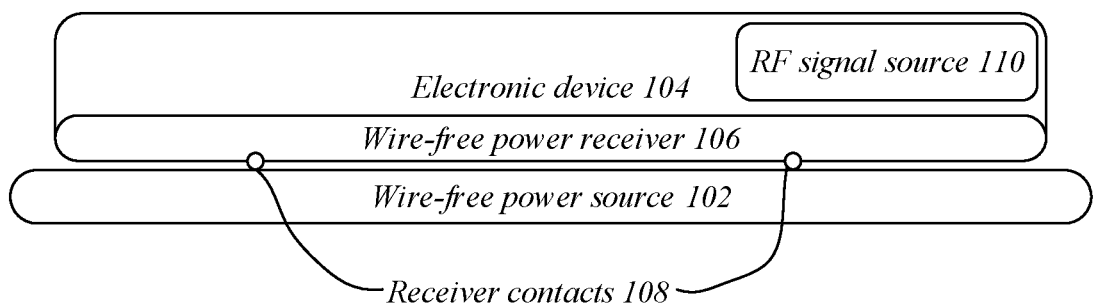
FIG. 1B illustrates an embodiment of a wire-free charging system that includes an RF signal source.

FIGS. 1A-1B illustrate embodiments of a wire-free charging system 100 in conjunction with a radio frequency (RF) signal source 110. Wire-free charging system 100 may include wire-free power source 102 and an electronic device 104 that includes a wire-free power receiver 106. In various embodiments, the wire-free power receiver 106 may be built into the electronic device 104 or attached to the electronic device 104. Wire-free power receiver 106 may include receiver contacts 108. The receiver contacts 108 may enable the wire-free power receiver 106 to couple with wire-free power source 102 and receive power for operating or charging electronic device 104. In various embodiments, RF signal source 110 may interfere with the usability and functionality of a safety or protection circuit and/or cause spurious emissions in wire-free charging system 100, such as undesirable harmonics that cause wire-free power source 102 to function improperly. In some embodiments, the wire-free charging system 100 may be able to detect an RF signal source 110 and alter one or more operational parameters of the wire-free charging system 100 in response. In various embodiments, altering the one or more operational parameters of the wire-free charging system 100 may prevent the RF signal source 110 from causing faulty operation in the wire-free charging system 100. For instance, RF signal source 110 may erroneously trigger a protection circuit in the wire-free charging system 100 that prevents the wire-free charging system 100 from charging electronic device 104. In some embodiments, RF signal source 110 may comprise an antenna. Embodiments are not limited in this context.

As can be seen in FIG. 1A, in some embodiments, RF signal source 110 may be separate from the wire-free charging system 100. For example, RF signal source 110 may include an alarm system with a cellular connection, a ham radio, a WIFI network, a cellular phone, a global positioning system, or similar. As can be seen in FIG. 1B, in some embodiments, RF signal source 110 may be included in one or more components of the wire-free charging system 100, such as electronic device 104. For instance, electronic device 104 may include a cellular phone that includes one or more antennas for connecting to a cellular network or a global positioning system that act as RF signal source 110.

In various embodiments, RF signal source 110 may include multiple RF signal sources that are remote to and/or included in the wire-free charging system 100. For instance, a strong RF signal from an RF signal source 110 near the wire-free charging system 100 may cause spurious emissions in the wire-free charging system and disturb RF communication of both an RF signal source 110 near the wire-free charging system 100 and an RF signal source 110 in electronic device 104. However, regardless of the location of the RF signal source 110, components of wire-free charging system 100 may operate to prevent erroneous operation of wire-free charging system 100 resulting from RF signals. In various embodiments, the components of wire-free charging system 100 that operate to prevent erroneous operation of wire-free charging system 100 may be included in one or more of wire-free power source 102, electronic device 104, and wire-free power receiver 106. In various embodiments described herein, couple may refer to one or more of a conductive, inductive, capacitive, communicative, and connective coupling.

Figure 2A:
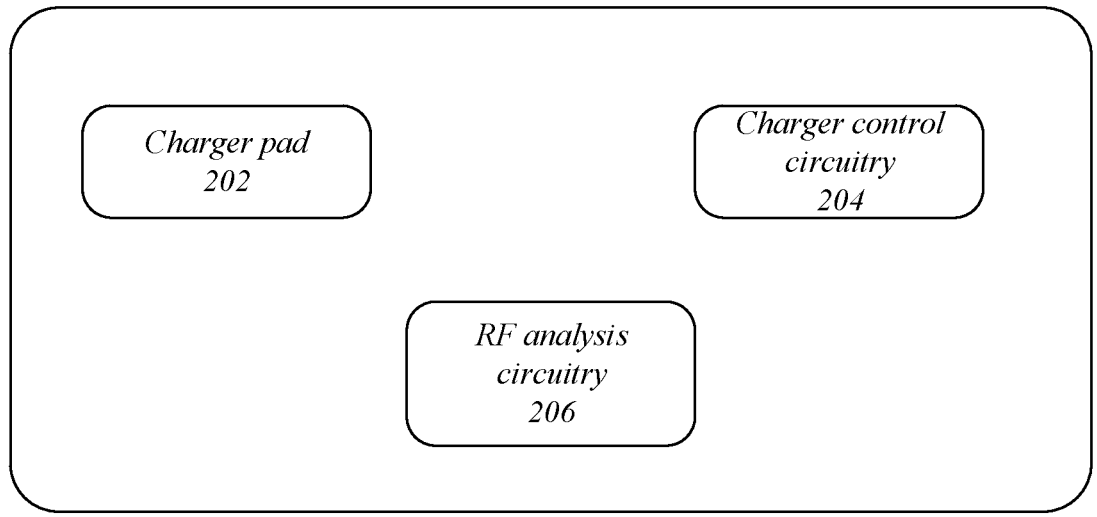
FIG. 2A illustrates a block diagram of an embodiment of a wire-free power source.

FIG. 2A illustrates a block diagram of an embodiment of wire-free power source 102. Wire-free power source 102 may include charger pad 202, charger control circuitry 204, and RF analysis circuitry 206. In other embodiments, RF analysis circuitry 206 may be included in wire-free power receiver 106. In various embodiments, charger pad 202 may couple with wire-free power receiver 106. Charger control circuitry 204 may provide power to and monitor the power provided to charger pad 202. In various embodiments, one or more safety circuits in charger control circuitry 204 may stop power from being provided to the charger pad 202 based on the monitored amount of power provided to the charger pad 202. For example, a safety circuit in charger control circuitry 204 may determine a short-circuit state exists in charger pad 202 and stop the flow of power to the charger pad 202 based on this determination. In some embodiments, RF analysis circuitry 206 may monitor charger pad 202 and prevent charger control circuitry 204 from improperly stopping the flow of power to charger pad 202. For example, RF signal source 110 may result in charger control circuitry 204 incorrectly determining a short-circuit state exists in charger pad 202. RF analysis circuitry 206 may identify that the short-circuit state was incorrectly determined by charger control circuitry 204 and cause one or more operational parameters of the charger control circuitry 204 to be altered such that the delivery of power to charger pad 202 can be safely resumed. In this and other ways, RF analysis circuitry 206 may improve the efficiency and reliability of wire-free power source 102. RF analysis circuitry 206 will be described in more detail with respect to FIGS. 4-6B. Embodiments are not limited in this context.

Figure 2B:
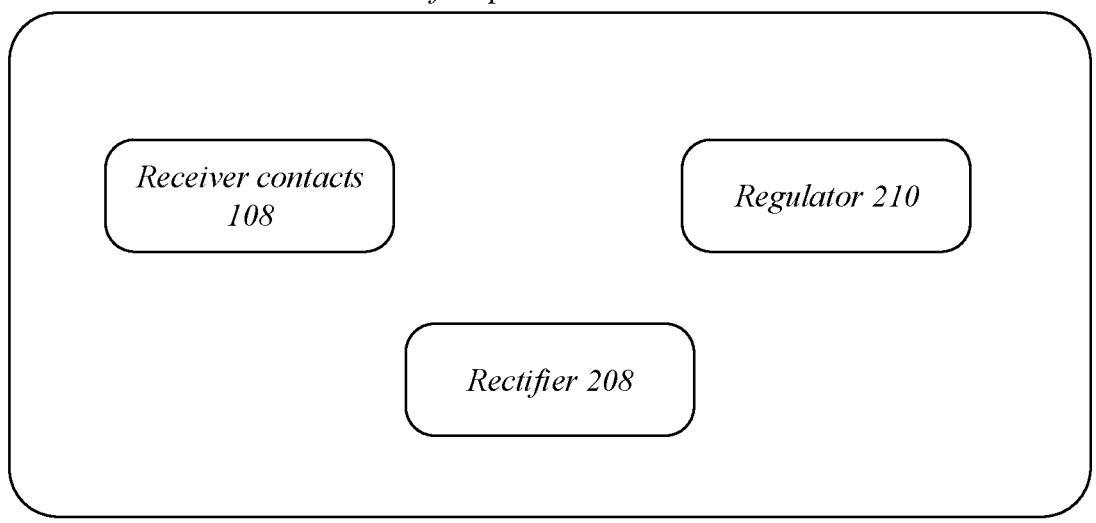
FIG. 2B illustrates a block diagram of an embodiment of a wire-free power receiver.

FIG. 2B illustrates a block diagram of an embodiment of wire-free power receiver 106. Wire-free power receiver 106 may include receiver contacts 108, rectifier 208, and regulator 210. In some embodiments, wire-free power receiver 106 may include two or more receiver contacts. For example, wire-free power receiver 106 may include four receiver contacts 108, three of the receiver contacts may form an equilateral triangle with the fourth receiver contact being positioned at the center of the equilateral triangle. Rectifier 208 may enable each receiver contact 108 to couple with either a positive polarity or a negative polarity contact on charger pad 202 of the wire-free power source 102. Regulator 210 may regulate the power received from charger pad 202 before the power is provided to electronic device 104. Embodiments are not limited in this context.

Figure 3:
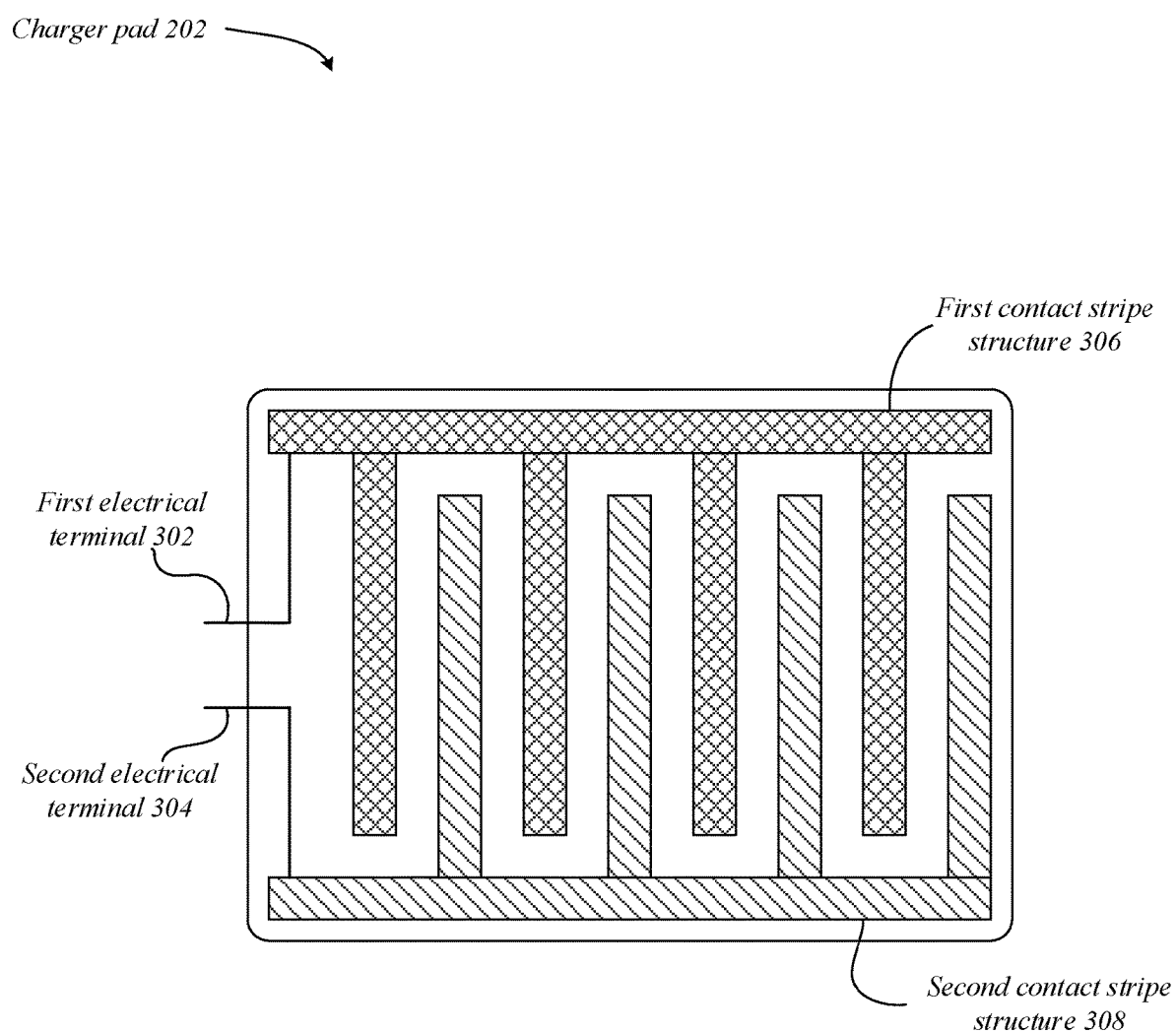
FIG. 3 illustrates an embodiment of a charger pad.

FIG. 3 illustrates an embodiment of a charger pad 202. Charger pad 202 may include first and second electrical terminals 302, 304 and first and second contact stripe structures 306, 308. In various embodiments first and second electrical terminals 302, 304 may couple to charger control circuitry 204. This coupling with first and second electrical terminals 302, 304 may enable charger control circuitry 204 to provide power to one or more electrical devices (e.g., electrical device 104) via first and second contact stripe structures 306, 308. For example, charger control circuitry 204 may create an electric potential between first and second contact stripe structures 306, 308. When at least one receiver contact 108 couples with the first contact stripe structure 306 and at least one other receiver contact 108 couples with the second contact stripe structure 308 a closed-circuit between the charger control circuitry 204 and electronic device 104 may be created. Creation of the closed-circuit may enable charger control circuitry 204 to deliver power to charger pad 202 for charging and/or operating electronic device 104. Embodiments are not limited in this context.

It will be appreciated that while components of charger pad 202 and/or contact stripe structures 306, 308 can include the arrangement described above, other arrangements, such as different contact patterns, can additionally or alternatively be implemented without departing from the present disclosure.

In various embodiments, RF signals may couple to components of wire-free charging system 100, resulting in false alarms or otherwise disturb operation of the wire-free charging system 100. For example, antenna currents from RF signal source 110 may flow through receiver contacts 108 into contact stripe structures 306, 308 resulting in an undesirable coupling to rectifier 208 and charger control circuitry 204. In another example, an RF signal may couple directly from an antenna to the contact stripe structures 306, 308 resulting in an undesirable RF coupling to rectifier 208 and charger control circuitry 204. In various embodiments, coupling to rectifier 208 and charger control circuitry 204 may trip a safety circuit in wire-free charging system 100, stopping or delaying charging or powering of electronic device 104.

Figure 4A:
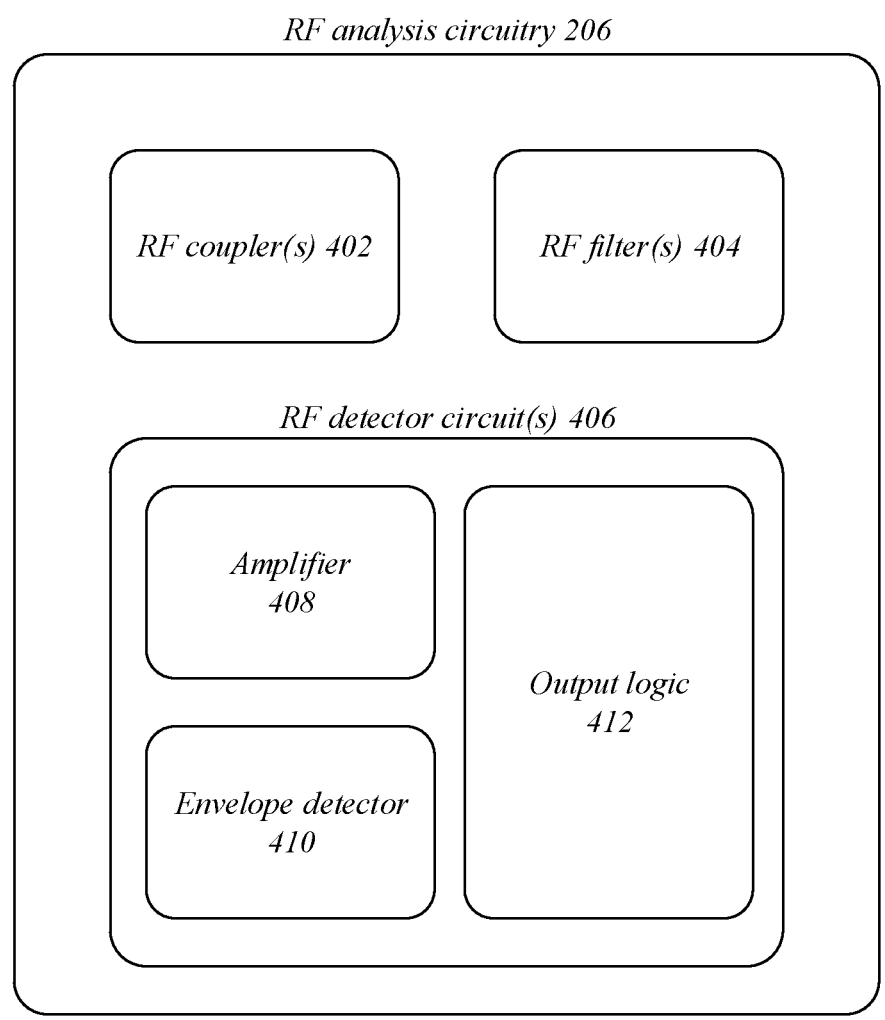
FIG. 4A illustrates a block diagram of a first embodiment of RF analysis circuitry.
Figure 4B:
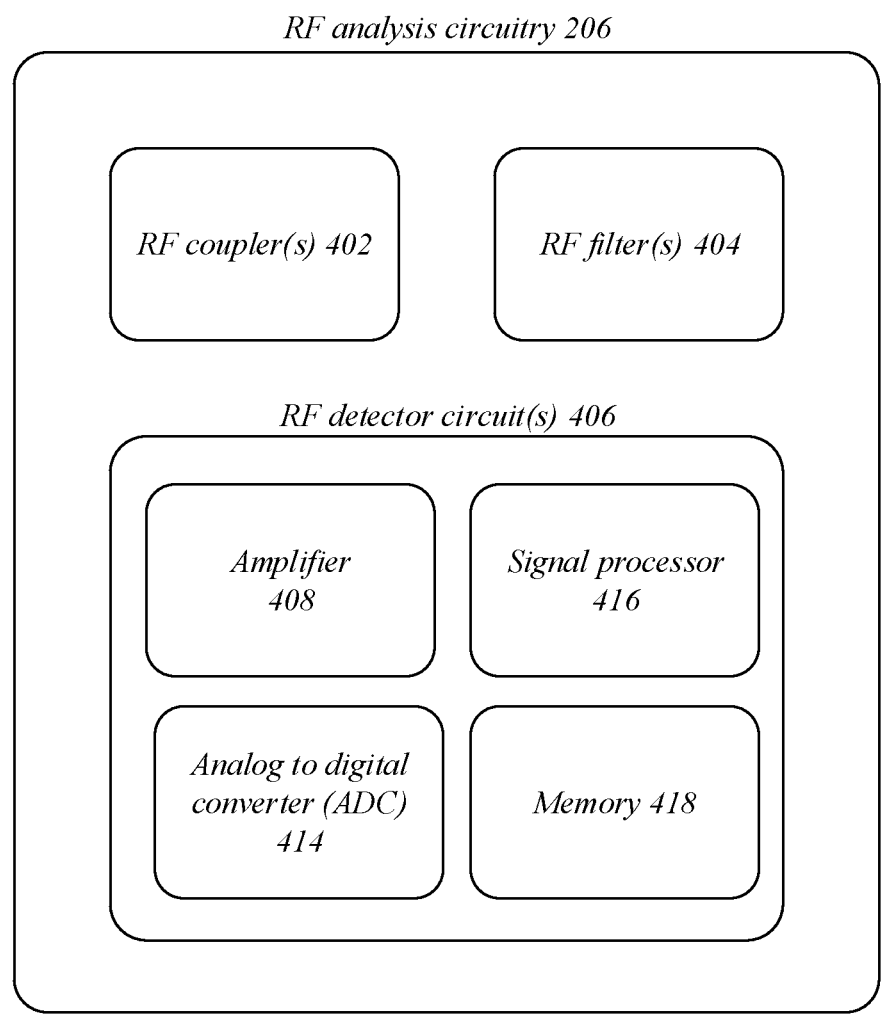
FIG. 4B illustrates a block diagram of a second embodiment of RF analysis circuitry.

FIGS. 4A-4B illustrate block diagrams of first and second embodiments of RF analysis circuitry 206. RF analysis circuitry 206 may enable the wire-free charging system 100 to charge an electronic device 104 in a safer and more efficient manner by preventing RF signals from causing the charger control circuitry 204 to improperly stop or reduce the amount of power provided to charger pad 202, and thus delivered to electronic devices. Various embodiments described herein may include RF analysis circuitry 206 that includes components to produce a coupler signal based on an incident signal in wire-free power source 102, identify whether the coupler signal includes a target characteristic, and alter an operational parameter of the wire-free power source when the coupler signal includes the target characteristic. For instance, there may be a radio frequency (RF) coupler included in a wire-free charging system to generate a coupler signal based on a detected cellular TX signal. The coupler signal may be analyzed to determine information about the cellular TX signal. The determined information about the cellular TX signal may be used to alter one or more operational parameters of the wire-free charging system. Embodiments are not limited in this context.

In the illustrated embodiments, RF analysis circuitry 206 may include RF coupler(s) 402, RF filter(s) 404, and RF detector circuit(s) 406. In FIG. 4A, RF detector circuit(s) 406 may include amplifier 408, envelope detector 410, and output logic 412. In FIG. 4B, RF detector circuit(s) 406 may include analog to digital converter (ADC) 414, signal processor 416, and memory 418 in addition to amplifier 408. The components of RF analysis circuitry 206 may operate to improve the reliability, functionality, and safety of wire-free charging system 100 by enabling wire-free charging system 100 to prevent RF signals from causing erroneous operation of the wire-free charging system 100. It will be appreciated that the components of RF analysis circuitry 206 illustrated in FIGS. 4A-B are exemplary and other means of preventing RF signals from interrupting operation of wire-free charging system 100 may be used without departing from the scope of this disclosure. Further, in various embodiments, multiple RF detector circuits 406 may be utilized (see e.g., FIGS. 5C and 6B). In various such embodiments, one or more components of the RF detector circuits 406 may be shared by multiple RF detector circuits. For example, multiple RF detector circuits 406 may share signal processor 416 and/or memory 418.

In some embodiments, RF coupler(s) 402 may couple to a defined amount of power flowing through a conductor in wire-free charging system 100 and provide a signal sample or coupler signal. In various embodiments, RF coupler(s) 402 may produce a coupler signal based on an incident signal in wire-free power source 102. For instance, an RF coupler structure may pick up cellular TX signals. In some embodiments, producing a coupler signal may refer to detecting or picking-up an RF signal, such as a cellular TX signal, and feeding or delivering the RF signal to RF detector circuits 406. Placement of RF coupler(s) with respect to other components of the wire-free charging system 100 will be described in more detail with respect to FIGS. 5A-C.

In some embodiments, the coupler signal may pass through RF filter(s) 404. In various embodiments, RF filter(s) 404 may include one or more band pass filters. RF filter(s) 404 may perform analog signal processing functions by removing unwanted frequency components, enhancing wanted frequency components, or both. In some embodiments, RF detector circuit(s) 406 may receive the coupler signal, identify whether the coupler signal includes a target characteristic, and alter an operational parameter of the wire-free power source when the coupler signal includes the target characteristic.

Referring to the embodiment of FIG. 4A, RF detector circuit 406 may receive the coupler signal via amplifier 408. Amplifier 408 may increase the power of the coupler signal. In the illustrated embodiment, envelope detector 410 may receive the amplified coupler signal and provide an output that is the envelope of the amplified coupler signal. In various such embodiments, envelope detector 410 may include a diode detector. The envelope of the amplified coupler signal may be received by output logic 412. In some embodiments, output logic 412 may alter one or more operational parameters of wire-free charging system 100 based on the envelope of the amplified coupler signal. For instance, output logic 412 may cause charger control circuitry 204 to repeat a detection function. In some embodiments, when RF detector circuit 406 determines a cellular TX capable device is identified on charger pad 202, a mode of a safety circuit in charger control circuitry 204 may be modified so that before power is disconnected from charger pad 202, the wire-free charging system 100 may repeat a detection function related to the safety circuit a defined number of times to ensure that a cellular TX signal did not disturb the functionality of the safety feature of the detection function. In another example, output logic 412 may suggest relocation of electronic device 104 including RF signal source 110 via a user interface. In such examples with a user interface, the user interface may include an audio source, a light source, a vibration source, or the like for providing the suggestion. In some examples, a device place on charger pad 202 may boot up when it receives sufficient power and being to communicate with a base station with full power. In some such examples, a time may be specified when the wire-free charging system 100 ignores detections to ensure smooth boot up of the device. In some such example, the wire-free charging system 100 may suggest repositioning the device on charger pad 202 to optimize smooth charging.

Referring to the embodiment of FIG. 4B, RF detector circuit 406 may again receive the coupler signal via amplifier 408. In the illustrated embodiments, ADC 414 may convert the amplified coupler signal into a digital signal. Signal processor 416 may receive and analyze the digital signal. In some embodiments, signal processor 416 may include one or more of a microcontroller, a system on a chip (SOC), and the like. For instance, signal processor 416 may analyze the level of harmonics, modulation type, signal bandwidth, or any other RF signal parameters. In some embodiments, RF signal parameters may include a target characteristic. Analysis of the digital signal may be carried out according to one or more instructions included in memory 418. In some embodiments, signal processor 416 may alter one or more operational parameters of wire-free charging system 100 based on the analysis. For example, alteration of one or more operational parameters of the wire-free charging system 100 may result in one or more of stop charging, reduce power, activate additional filter circuit, change mode of a safety circuit, activate a noise reduction algorithm, suggest repositioning of electronic device 104, and the like. In various embodiments, memory 418 may include one or more adjustable thresholds and corresponding adjustments to one or more operational parameters of wire-free charging system 100 when the analysis determines the threshold is satisfied. For example, a detection threshold may be selected that is within some margin of a known signal level that causes spurious emissions in wire-free charging system 100. In some embodiments, identifying a target characteristic may be equivalent to determining a threshold is satisfied.

Figure 5A:
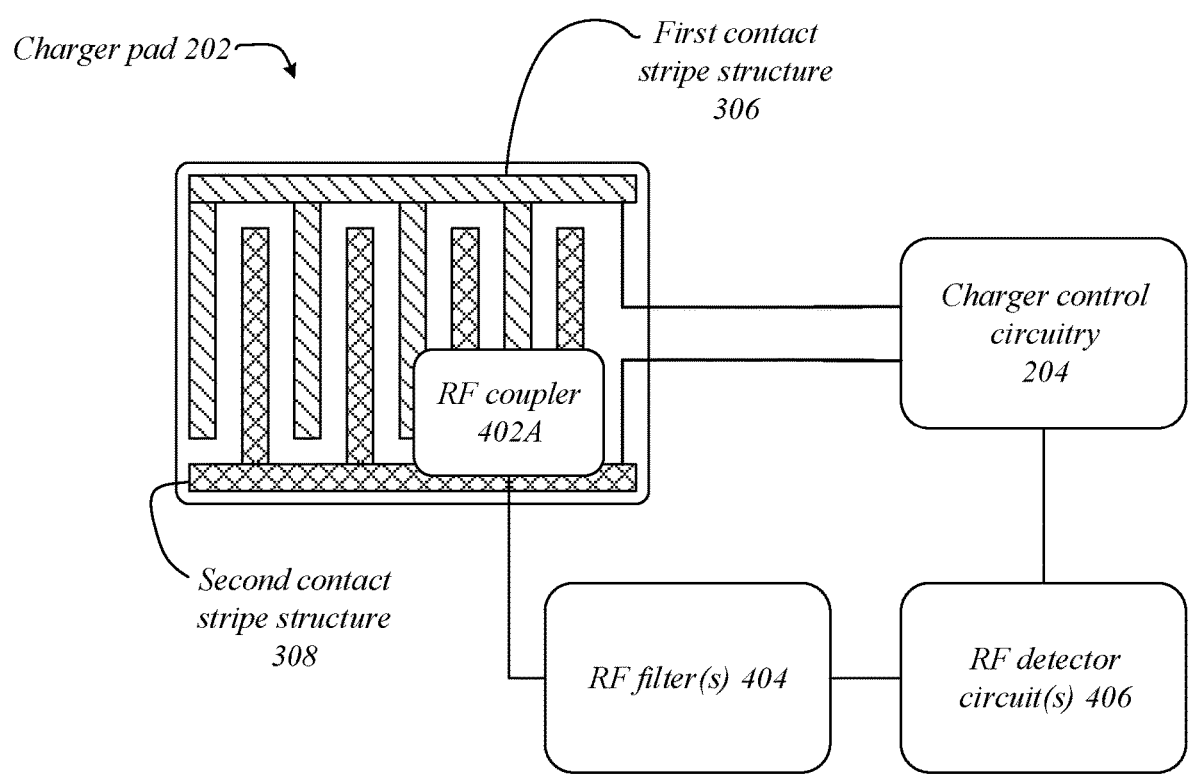
FIG. 5A illustrates a first arrangement of an RF coupler for a wire-free power source.
Figure 5B:
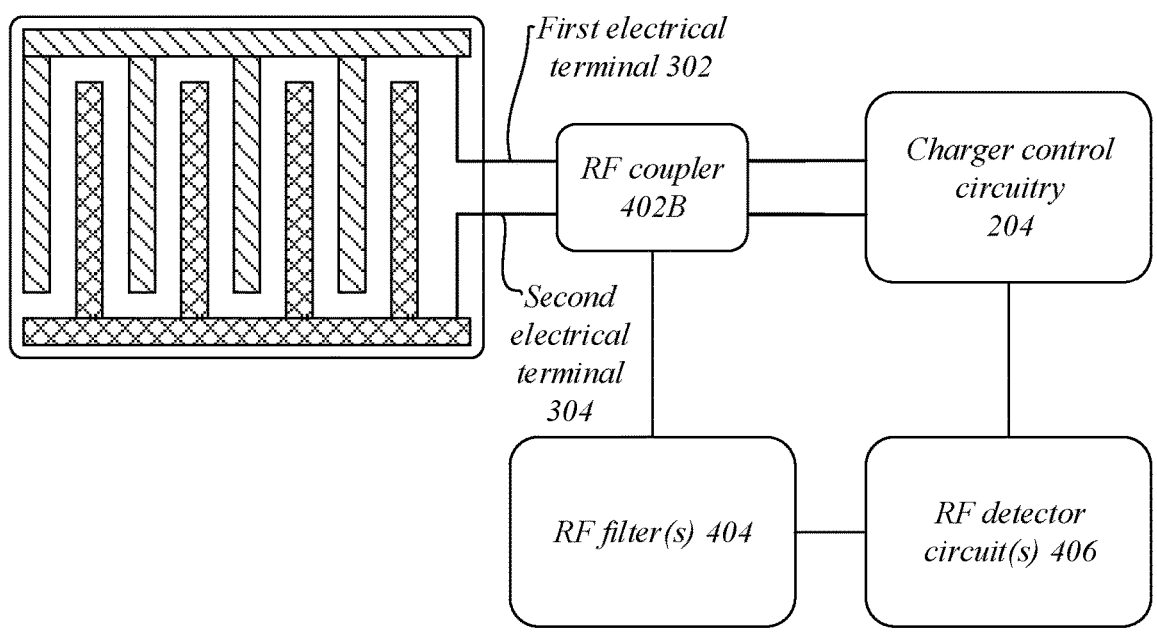
FIG. 5B illustrates a second arrangement of an RF coupler for a wire-free power source.
Figure 5C:
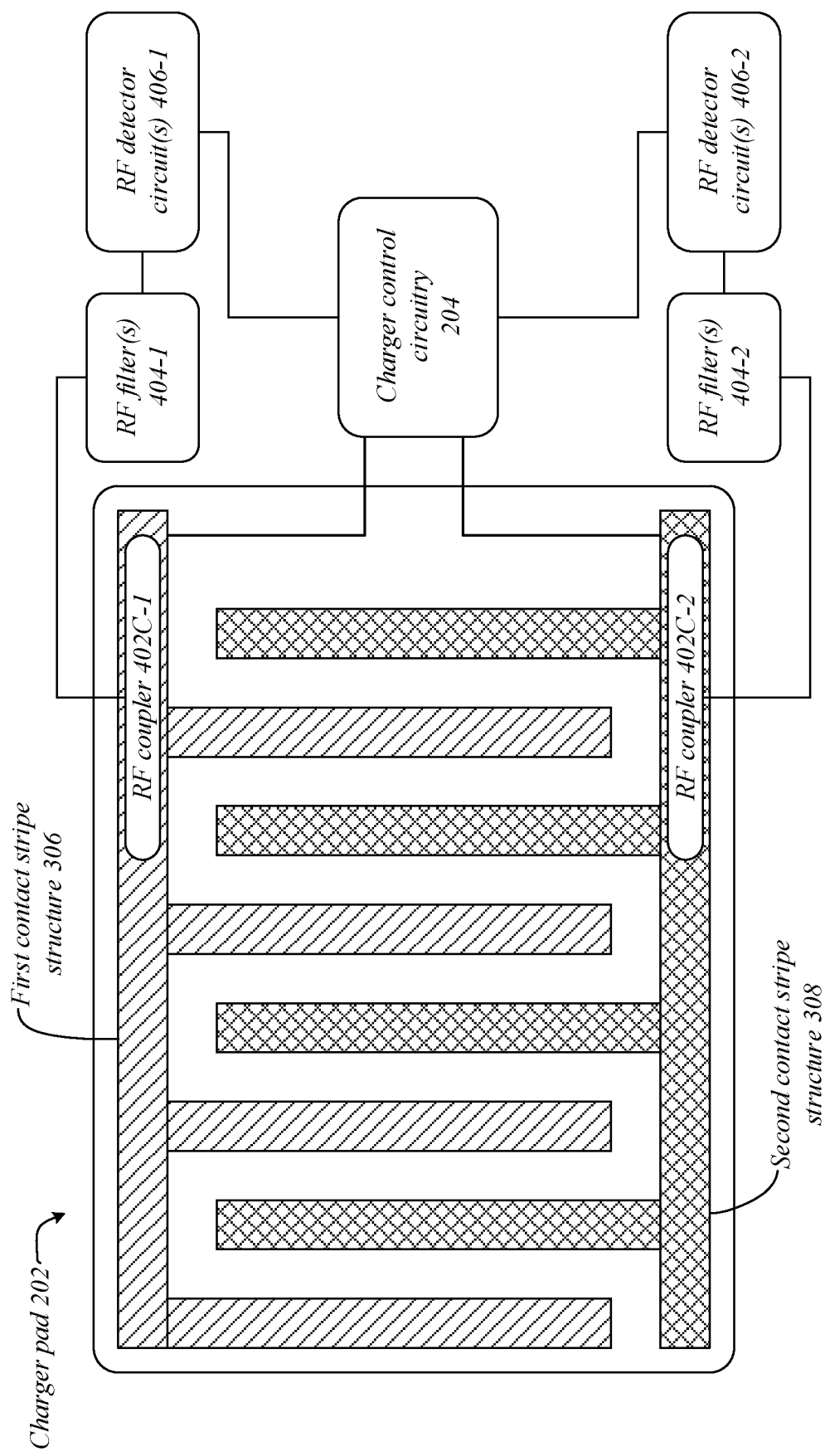
FIG. 5C illustrates a third arrangement of an RF coupler for a wire-free power source.

FIGS. 5A-5C illustrate various arrangements for RF coupler 402. RF coupler(s) 402 may couple to a defined amount of power flowing through a conductor in wire-free charging system 100 and provide a signal sample or coupler signal to RF detector circuit(s) 406 via RF filter(s) 402. RF detector circuit(s) 406 may alter one or more operational parameters of wire-free charging system 100 via charger control circuitry 204 based on analysis of the coupler signal. In the embodiment of FIG. 5A, wire-free charging system 100 may include RF coupler 402A. RF coupler 402A may be attached to first and second contact stripe structures 306, 308 of charger pad 202. In the embodiment of FIG. 5B, wire-free charging system 100 may include RF coupler 402B. RF coupler 402B may be attached to the first and second electrical terminals 302, 304 of charger pad 202. In the embodiment of 5C, wire-free charging system 100 may include RF coupler 402C-1 and RF coupler 402C-2. RF coupler 402C-1 may be attached to first contact stripe structure 306 and RF coupler 402C-2 may be attached to second contact stripe structure 308. Further, RF coupler 402C-1 may utilize RF filter(s) 404-1 and RF detector circuit(s) 406-1 and RF coupler 402C-2 may utilize RF filter(s) 404-2 and RF detector circuit(s) 406-2. This arrangement may enable wire-free charging system 100 to detect RF with two separate channels. In some embodiments, more than two channels may be used. For example, RF coupler 402B used in conjunction with RF couplers 402C-1, 402C-1 to enable wire-free charging system 100 to detect RF with three separate channels. Embodiments are not limited in this context.

Figure 6A:
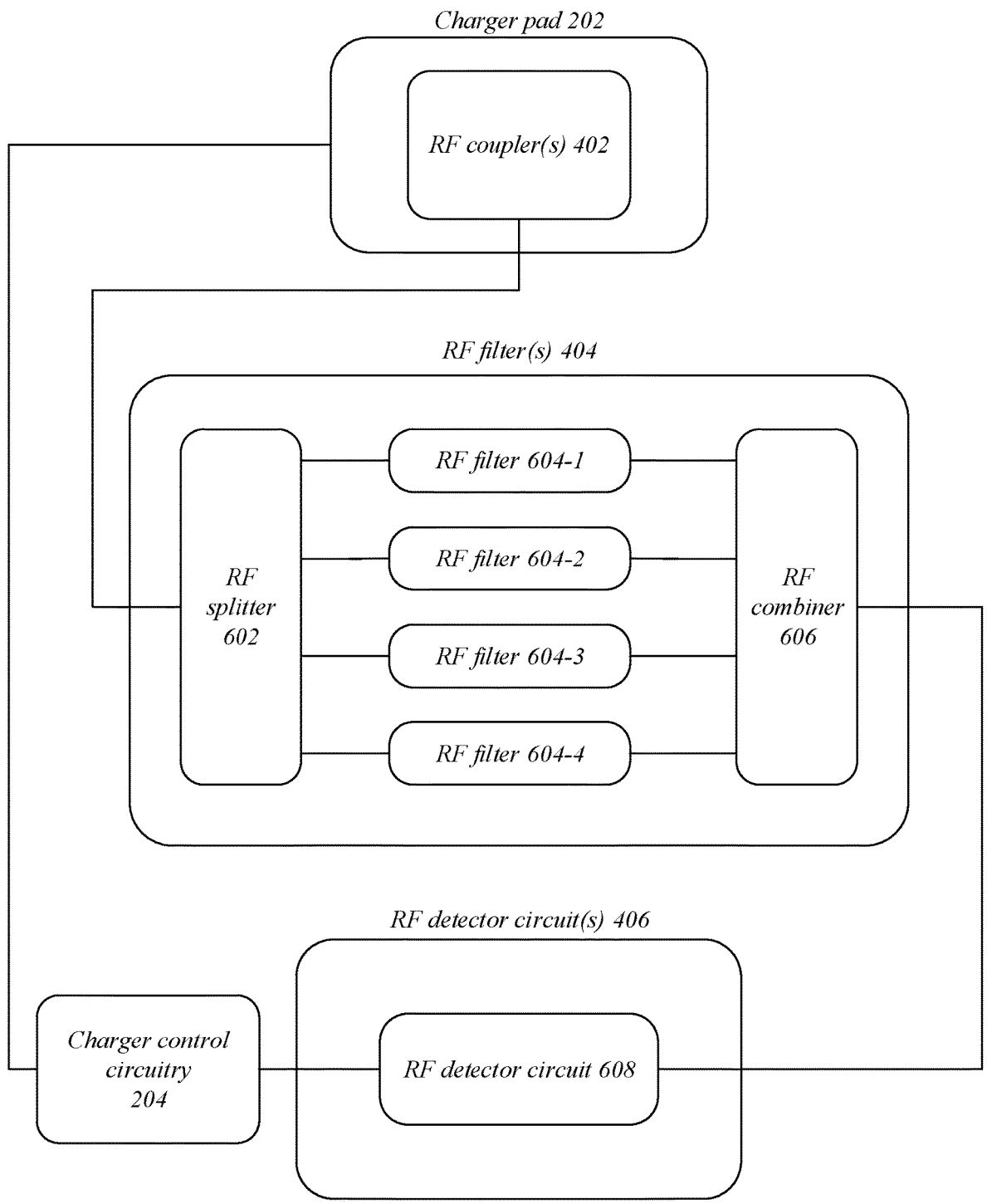
FIG. 6A illustrates a first arrangement of an RF filter and an RF detector circuit for a wire-free power source.
Figure 6B:
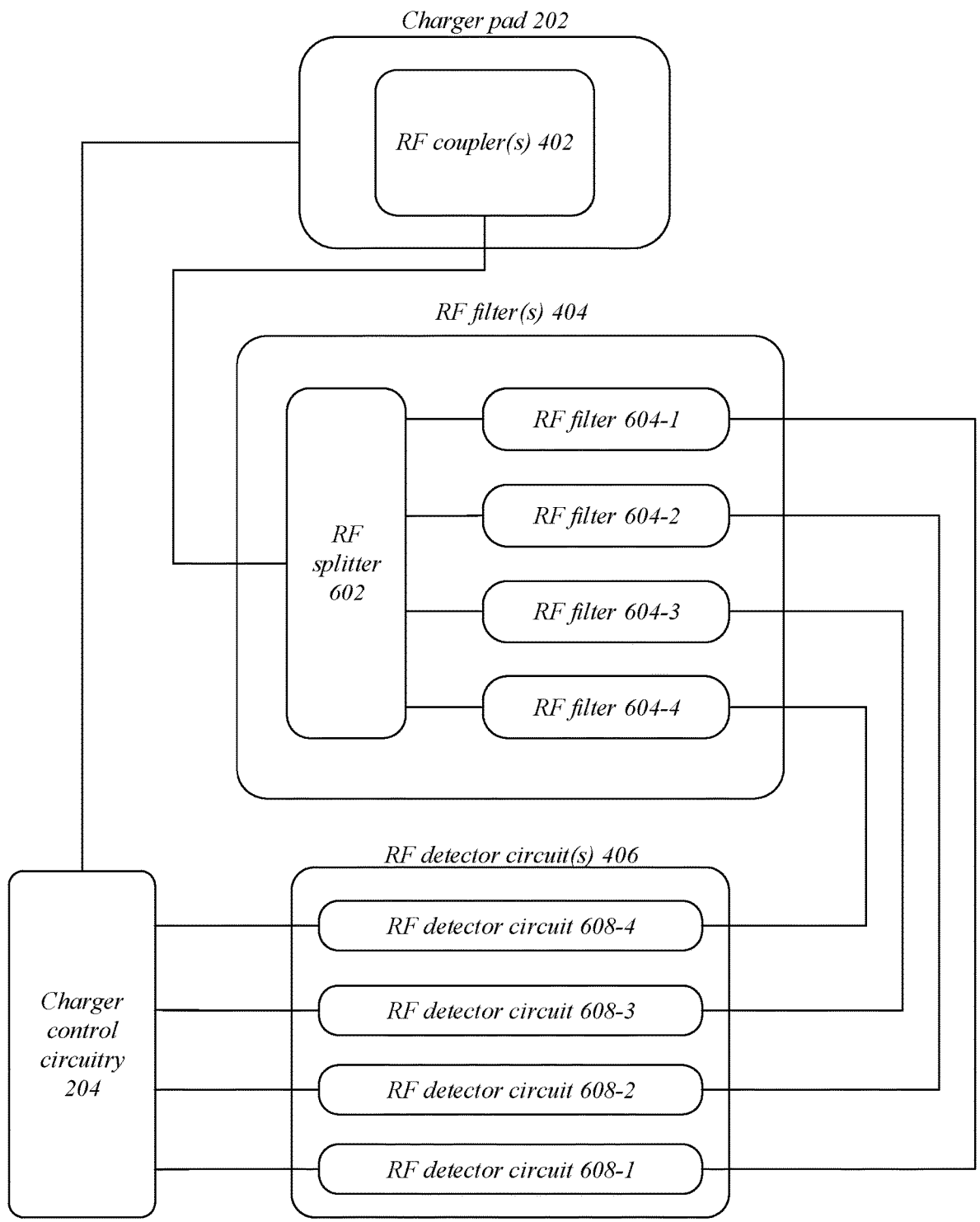
FIG. 6B illustrates a second arrangement of an RF filter and an RF detector circuit for a wire-free power source.

FIGS. 6A-6B illustrate first and second arrangements of RF filter(s) 404 and RF detector circuit(s) 406 for wire-free power source 102. RF filter(s) 404 may receive a coupler signal from RF coupler(s) 402. In some embodiments, RF filter(s) 404 may perform analog signal processing functions by removing unwanted frequency components, enhancing wanted frequency components, or both from the coupler signal. In various embodiments, RF detector circuit(s) 406 may receive the filtered coupler signal, identify whether the coupler signal includes a target characteristic, and alter an operational parameter of charger control circuitry 204 and/or charger pad 202 when the coupler signal includes the target characteristic.

In the embodiment of FIG. 6A, RF filter(s) 404 may include RF splitter 602, RF filters 604-1, 604-2, 604-3, 604-4, and RF combiner 606. RF detector circuit(s) 406 may include RF detector circuit 608. In various embodiments, RF splitter 602, RF filters 604-1, 604-2, 604-3, 604-4, and RF combiner 606 may comprise a band filter structure. In various such embodiments, the band filter structure may ensure that only RF signals are detected by filtering out noise on one or more other frequencies. The band filter structure may improve the performance of wire-free charging system 100 in noisy environments. In some embodiments, the band filter structure may include one or more of an RF band pass filter, a band filter bank, or the like.

In the embodiment of FIG. 6B, RF filter(s) 404 may include RF splitter 602 and RF filters 604-1, 604-2, 604-3, 604-4. RF detector circuit(s) 406 may include RF detector circuits 608-1, 608-2, 608-3, 608-4. The plurality of RF detector circuits 608-1, 608-2, 608-3, 608-4 may provide multiple measurement channels. Multiple measurement channels may improve the ability to detect signals and improve the overall functionality of the wire-free charging system 100. In some embodiments, each measurement channel may include a band filter structure.

FIG. 7 illustrates one embodiments of a logic flow 700. The logic flow 700 may be representative of some or all of the operations executed by one or more embodiments described herein, such as wire-free charging system 100, wire-free power source 102, or wire-free power receiver 106. Embodiments are not limited in this context.

In the illustrated embodiment shown in FIG. 7, the logic flow 700 may begin at block 702. At block 702 "produce a coupler signal with an RF coupler based on an incident signal in a wire-free power source" a coupler signal may be produced by an RF coupler based on an incident signal in a wire-free power source. For example, RF coupler(s) 402 may generate a coupler signal and pass the coupler signal to RF detector circuit 406. With various embodiments, the coupler signal may pass through RF filter(s) 404 prior to being received by RF detector circuit 406.

Continuing to block 704 "identify whether the coupler signal includes a target characteristic with an RF detection circuit" a determination may be made as to whether or not the coupler signal includes a target characteristic. For example, RF detector circuit 406 may determine whether the coupler signal includes a target characteristic (e.g., RF parameter) or satisfies a threshold using amplifier 408, ADC 414, signal processor 416, and memory 408. In some embodiments, identifying a target characteristic may be equivalent to determining a threshold is satisfied.

At block 706 "alter an operational parameter of the wire-free power source when the coupler signal includes the target characteristic", one or more operational parameters of wire-free power source 102 may be changed in response to identifying the target characteristic in the coupler signal. For example, the RF analysis circuitry 206 may prevent a safety circuit in the charger control circuitry 204 of wire-free charging system 100 from disconnecting power to charger pad 202 by causing the wire-free charging system 100 to repeat a safety circuit related detection operation one or more times prior to the safety circuit disconnecting power to ensure that a cellular TX signal did not cause a false alarm in the safety circuit related detection operation. With various embodiments, RF analysis circuitry 206 may cause suggestions to be provided on how to correct an issue with wire-free charging system 100 using a user interface. For example, user interface may be used to suggest repositioning electronic device 104 to improve functionality of wire-free charging system 100.

FIG. 8 illustrates an embodiment of a storage medium 800. Storage medium 800 may comprise any non-transitory computer-readable storage medium or machine-readable storage medium, such as an optical, magnetic or semiconductor storage medium. In various embodiments, storage medium 800 may comprise an article of manufacture. In some embodiments, storage medium 800 may store computer-executable instructions, such as computer-executable instructions to implement one or more of logic flows or operations described herein, such as with respect to 700 of FIG. 7. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 9:
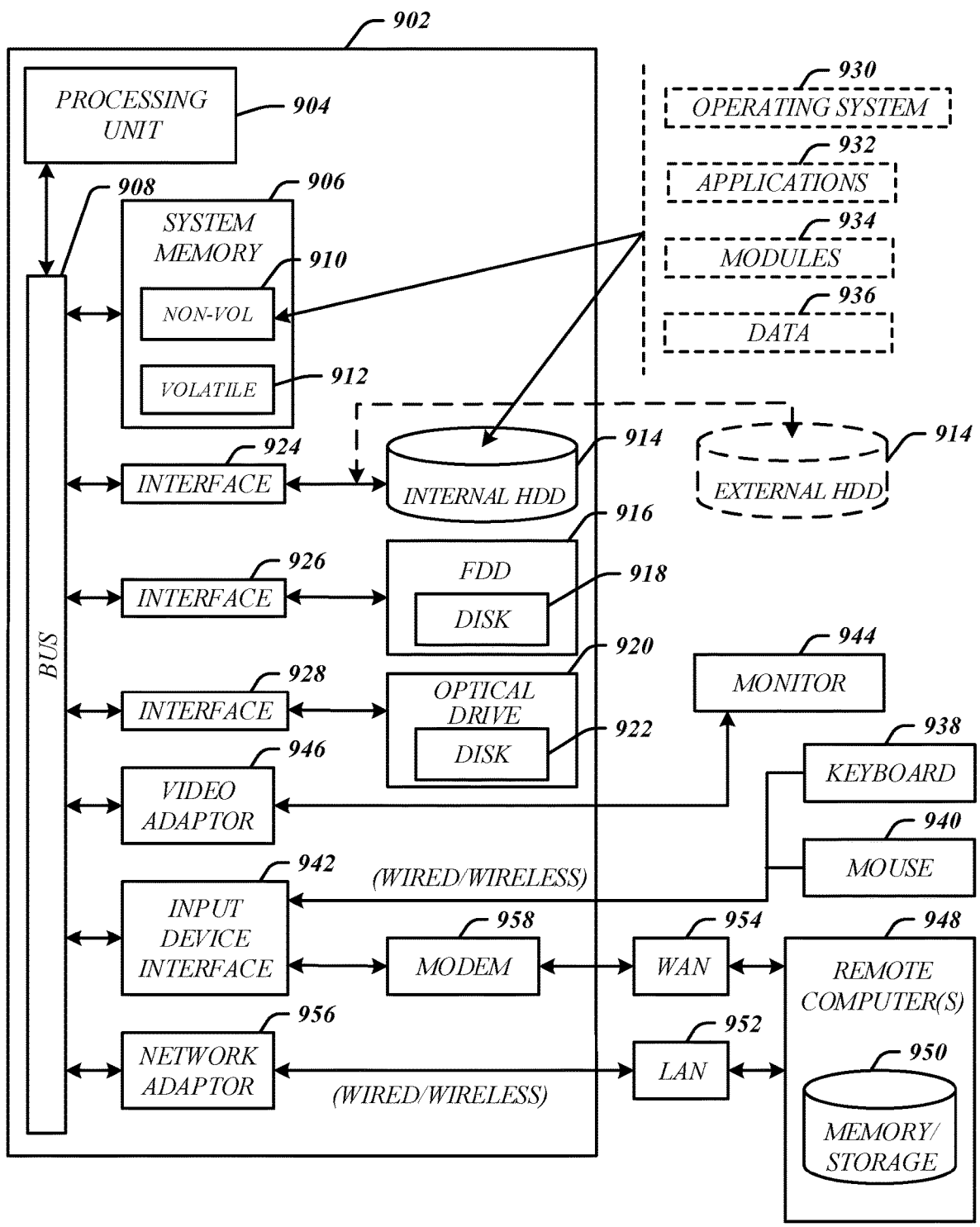
FIG. 9 illustrates an embodiment of a computing architecture.

FIG. 9 illustrates an embodiment of an exemplary computing architecture 900 that may be suitable for implementing various embodiments as previously described. In various embodiments, the computing architecture 900 may comprise or be implemented as part of an electronic device. In some embodiments, the computing architecture 900 may be representative, for example, of a processor server that implements one or more components of the wire-free charging system 100. In some embodiments, computing architecture 900 may be representative, for example, of a wearable device that implements one or more components of wire-free power source 102. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 994 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the wire-free charging system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 994 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
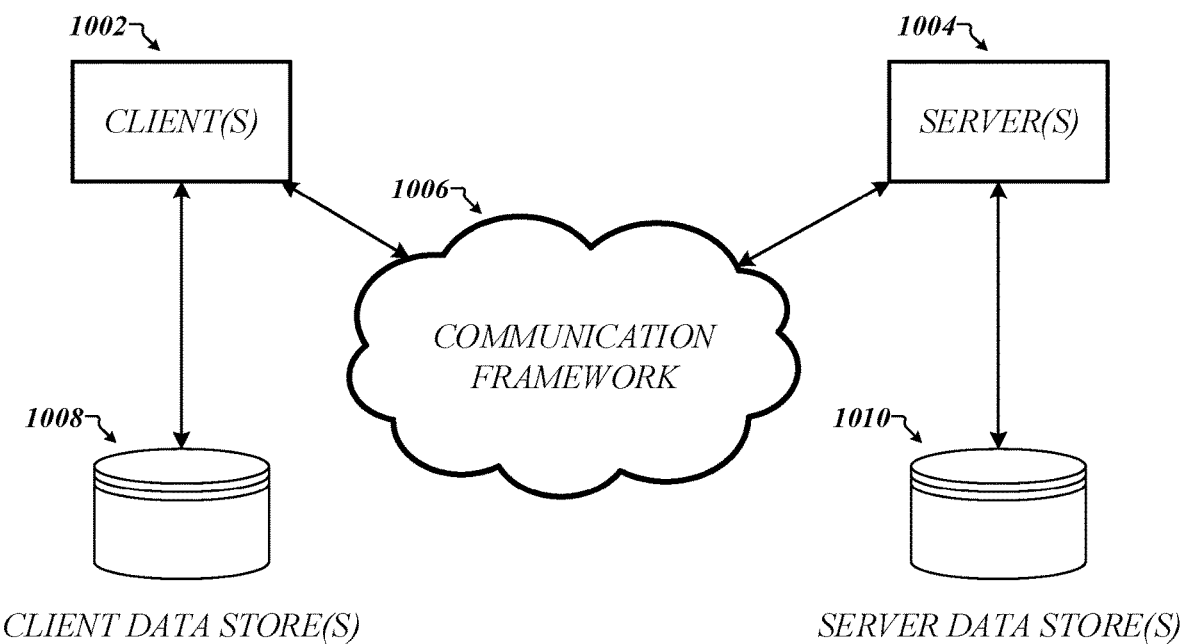
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 and the servers 1004 are operatively connected to one or more respective client data stores 1008 and server data stores 1010 that can be employed to store information local to the respective clients 1002 and servers 1004, such as cookies and/or associated contextual information. In various embodiments, any one of servers 1004 may implement one or more of logic flows or operations described herein, and storage medium 800 of FIG. 8 in conjunction with storage of data received from any one of clients 1002 on any of server data stores 1010.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus, comprising: an radio frequency (RF) coupler to produce a coupler signal based on an incident signal in a wire-free power source; and an RF detection circuit to receive the coupler signal, identify whether the coupler signal includes a target characteristic, and alter an operational parameter of the wire-free power source when the coupler signal includes the target characteristic.

Example 2 includes the subject matter of Example 1, the target characteristic to include a radio frequency (RF) signal.

Example 3 includes the subject matter of Example 2, the RF signal produced by a wireless transmitter signal.

Example 4 includes the subject matter of Example 1, the target characteristic to indicate interference with operation of the wire-free power source by an RF signal source.

Example 5 includes the subject matter of Example 4, the RF signal source to comprise a cellular phone.

Example 6 includes the subject matter of Example 1, the RF coupler coupled with a contact stripe structure of the wire-free power source.

Example 7 includes the subject matter of Example 1, the RF coupler coupled to an output of charger control circuitry of the wire-free power source.

Example 8 includes the subject matter of Example 1, the RF coupler to comprise a first RF coupler and a second RF coupler, the first RF coupler coupled to a first contact stripe structure of the wire-free power source and the second RF coupler coupled to a second contact stripe structure of the wire-free power source, the first and second contact stripe structures having opposite polarity.

Example 9 includes the subject matter of Example 1, the RF detection circuit to comprise an amplifier, an RF detector, and an output logic circuit.

Example 10 includes the subject matter of Example 1, the RF detection circuit to comprise an amplifier, an analog to digital converter (ADC), and a signal processor.

Example 11 includes the subject matter of Example 1, alteration of the operational parameter of the wire-free power source to cause the wire-free power source to stop charging an electronic device, reduce power, activate a filter circuit, activate a noise reduction algorithm, activate a safety function, change mode of a charger control circuitry of the wire-free power source, or repeat a detection function of the charger control circuitry.

Example 12 includes the subject matter of Example 1, alteration of the operational parameter of the wire-free power source to cause the wire-free power source to suggest relocation of an RF signal source with respect to the wire-free power source.

Example 13 includes the subject matter of Example 12, the wire-free power source to suggest relocation of the RF signal source with respect to the wire-free power source via a user interface, the user interface to comprise one or more of an audio source, a light source, or a vibration source.

Example 14 includes the subject matter of Example 1, the RF detection circuit to analyze a level of harmonics, a modulation type, a power level, a field strength, or a signal bandwidth of the coupler signal to identify whether the coupler signal includes the target characteristic.

Example 15 includes the subject matter of Example 1, the coupler signal received by the RF detection circuit from the RF coupler via one or more RF filters.

Example 16 includes the subject matter of Example 15, the one or more RF filters to include a bandpass filter.

Example 17 is a method, comprising: producing a coupler signal with an radio frequency (RF) coupler based on an incident signal in a wire-free power source; identifying whether the coupler signal includes a target characteristic with an RF detection circuit; and altering an operational parameter of the wire-free power source when the coupler signal includes the target characteristic.

Example 18 includes the subject matter of Example 17, the target characteristic to include a radio frequency (RF) signal.

Example 19 includes the subject matter of Example 18, the RF signal to include a cellular transmitter signal.

Example 20 includes the subject matter of Example 17, the target characteristic indicating an RF signal source interfering with operation of the wire-free power source.

Example 21 includes the subject matter of Example 20, the RF signal source comprising a cellular phone.

Example 22 includes the subject matter of Example 17, the RF coupler coupled to a contact stripe structure of the wire-free power source.

Example 23 includes the subject matter of Example 17, the RF coupler coupled to an output of charger control circuitry of the wire-free power source.

Example 24 includes the subject matter of Example 17, the RF coupler comprising a first RF coupler and a second RF coupler, the first RF coupler coupled to a first contact stipe structure of the wire-free power source and the second RF coupler coupled to a second contact stripe structure of the wire-free power source, the first and second contact stripe structures having opposite polarity.

Example 25 includes the subject matter of Example 17, the RF detection circuit comprising an amplifier, a diode detector, and an output logic circuit.

Example 26 includes the subject matter of Example 17, the RF detection circuit comprising an amplifier, an analog to digital converter (ADC), and a signal processor.

Example 27 includes the subject matter of Example 17, comprising altering the operational parameter of the wire-free power source including one or more of stopping charging of an electronic device, reducing power, activating a filter circuit, activating a noise reduction algorithm, activating a safety function, changing a mode of a charger control circuitry of the wire-free power source, and repeating a detection function of the charger control circuitry.

Example 28 includes the subject matter of Example 17, comprising altering the operation parameter of the wire-free power source comprising suggesting relocation of an RF signal source with respect to the wire-free power source.

Example 29 includes the subject matter of Example 28, comprising suggesting relocation of the RF signal source with respect to the wire-free power source including one or more of providing an audible, visual, or tactile signal via a user interface.

Example 30 includes the subject matter of Example 17, comprising identifying whether the coupler signal includes the target characteristic via one or more of analyzing a level of harmonics, a modulation type, and a signal bandwidth of the coupler signal.

Example 31 includes the subject matter of Example 17, the coupler signal received by the RF detection circuit after passing through one or more RF filters.

Example 32 includes the subject matter of Example 31, the one or more RF filters including a bandpass filter.

Example 33 is one or more computer-readable media to store instructions that when executed by a processor circuit causes the processor circuit to: receive a coupler signal; identify whether the coupler signal includes a target characteristic; and alter an operational parameter of a wire-free power source when the coupler signal includes the target characteristic.

Example 34 includes the subject matter of Example 33, the target characteristic to include a radio frequency (RF) signal.

Example 35 includes the subject matter of Example 34, the RF signal to include a cellular transmitter signal.

Example 36 includes the subject matter of Example 33, the target characteristic to indicate interference with operation of the wire-free power source by an RF signal source.

Example 37 includes the subject matter of Example 36, the RF signal source to comprise a cellular phone.

Example 38 includes the subject matter of Example 33, alteration of the operational parameter of the wire-free power source to cause the wire-free power source to stop charging an electronic device, reduce power, activate a filter circuit, activate a noise reduction algorithm, activate a safety function, change mode of a charger control circuitry of the wire-free power source, or repeat a detection function of the charger control circuitry.

Example 39 includes the subject matter of Example 33, alteration of the operational parameter of the wire-free power source to cause the wire-free power source to suggest relocation of an RF signal source with respect to the wire-free power source.

Example 40 includes the subject matter of Example 39, the wire-free power source to suggest relocation of the RF signal source with respect to the wire-free power source via a user interface, the user interface to comprise one or more of an audio source, a light source, or a vibration source.

Example 41 includes the subject matter of Example 33, with instructions to analyze a level of harmonics, a modulation type, or a signal bandwidth of the coupler signal to identify whether the coupler signal includes the target characteristic.

Example 42 is a system to charge an electronic device, comprising: a charger pad with a first and second electrical terminal; charger control circuitry to create an electric potential between the first and second electrical terminal; an radio frequency (RF) coupler to produce a coupler signal based on an incident signal in the charger pad or the charger control circuitry; and an RF detection circuit to receive the coupler signal, identify whether the coupler signal includes a target characteristic, and alter an operational parameter of the charger control circuitry when the coupler signal includes the target characteristic.

Example 43 includes the subject matter of Example 42, the target characteristic to include a radio frequency (RF) signal.

Example 44 includes the subject matter of Example 43, the RF signal to include a cellular transmitter signal.

Example 45 includes the subject matter of Example 42, the target characteristic to indicate interference with operation of the charger pad or the charger control circuitry by an RF signal source.

Example 46 includes the subject matter of Example 45, the RF signal source to comprise a cellular phone.

Example 47 includes the subject matter of Example 42, the RF coupler coupled to a contact stripe structure of the charger pad.

Example 48 includes the subject matter of Example 42, the RF coupler coupled to an output of the charger control circuitry.

Example 49 includes the subject matter of Example 42, the RF coupler to comprise a first RF coupler and a second RF coupler, the first RF coupler coupled to a first contact stripe structure of the charger pad and the second RF coupler coupled to a second contact stripe structure of the charger pad, the first and second contact stripe structures having opposite polarity.

Example 50 includes the subject matter of Example 42, the RF detection circuit to comprise an amplifier, a diode detector, and an output logic circuit.

Example 51 includes the subject matter of Example 42, the RF detection circuit to comprise an amplifier, an analog to digital converter (ADC), and a signal processor.

Example 52 includes the subject matter of Example 42, alteration of the operational parameter of the charger control circuitry to cause the charger control circuitry to stop charging an electronic device, reduce power, activate a filter circuit, activate a noise reduction algorithm, activate a safety function, change mode of the charger control circuitry, or repeat a detection function of the charger control circuitry.

Example 53 includes the subject matter of Example 42, alteration of the operational parameter of the charger control circuitry to suggest relocation of an RF signal source with respect to the charger pad.

Example 54 includes the subject matter of Example 53, the RF detection circuit to suggest relocation of the RF signal source with respect to the charger pad via a user interface, the user interface to comprise one or more of an audio source, a light source, or a vibration source.

Example 55 includes the subject matter of Example 42, the RF detection circuit to analyze a level of harmonics, a modulation type, or a signal bandwidth of the coupler signal to identify whether the coupler signal includes the target characteristic.

Example 56 includes the subject matter of Example 42, the coupler signal received by the RF detection circuit from the RF coupler via one or more RF filters.

Example 57 includes the subject matter of Example 56, the one or more RF filters to include a bandpass filter.

Example 58 is an apparatus, comprising: coupler means to produce a coupler signal based on an incident signal in a wire-free power source; and detection means to receive the coupler signal, identify whether the coupler signal includes a target characteristic, and alter an operational parameter of the wire-free power source when the coupler signal includes the target characteristic.

Example 59 includes the subject matter of Example 58, the target characteristic to include a radio frequency (RF) signal.

Example 60 includes the subject matter of Example 59, the RF signal to include a cellular transmitter signal.

Example 61 includes the subject matter of Example 58, the target characteristic to indicate interference with operation of the wire-free power source by an interference means.

Example 62 includes the subject matter of Example 61, the interference means to comprise a cellular phone.

Example 63 includes the subject matter of Example 58, the coupler means coupled to a contact stripe structure of the wire-free power source.

Example 64 includes the subject matter of Example 58, the coupler means coupled to an output of charger control circuitry of the wire-free power source.

Example 65 includes the subject matter of Example 58, the coupler means to comprise a first coupler means and a second coupler means, the first coupler means coupled to a first contact stripe structure of the wire-free power source and the second coupler means coupled to a second contact stripe structure of the wire-free power source, the first and second contact stripe structures having opposite polarity.

Example 66 includes the subject matter of Example 58, the detection means to comprise an amplifier, a diode detector, and an output logic circuit.

Example 67 includes the subject matter of Example 58, the detection means to comprise an amplifier, an analog to digital converter (ADC), and a signal processor.

Example 68 includes the subject matter of Example 58, alteration of the operational parameter of the wire-free power source to cause the wire-free power source to stop charging an electronic device, reduce power, activate a filter means, activate a noise reduction means, activate a safety means, change mode of a control means of the wire-free power source, or repeat a detection function of the control means.

Example 69 includes the subject matter of Example 58, alteration of the operational parameter of the wire-free power source to cause the wire-free power source to suggest relocation of an interference means with respect to the wire-free power source.

Example 70 includes the subject matter of Example 69, the wire-free power source to suggest relocation of the interference means with respect to the wire-free power source via an interface means, the interface means to comprise one or more of an audio source, a light source, or a vibration source.

Example 71 includes the subject matter of Example 58, the detection means to analyze a level of harmonics, a modulation type, or a signal bandwidth of the coupler signal to identify whether the coupler signal includes the target characteristic.

Example 72 includes the subject matter of Example 58, the coupler signal received by the detection means from the coupler means via one or more filter means.

Example 73 includes the subject matter of Example 72, the one or more filter means to include a bandpass filter.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus, comprising:
a power source;
a charger pad coupled to the power source, the charger pad to emit a radio frequency (RF) coupler signal based in part on a power signal incident from the power source;
an RF detection circuit, the RF detection circuit to:
receive the RF coupler signal; and
determine whether the RF coupler signal includes a target characteristic, the target characteristic to indicate an interference of the RF coupler signal with an RF signal source, the RF signal source external to the apparatus; and
an RF filter circuit coupled to the RF detection circuit and the charger pad, the RF filter circuit to modify the RF coupler signal based in part on a determination that the RF coupler signal includes the target characteristic to reduce the interference of the RF coupler signal with the RF signal source.

2. The apparatus of claim 1, wherein the target characteristic includes an RF signal generated by the RF signal source.

3. The apparatus of claim 2, comprising a charger control circuit coupled to the power source and the charger pad, the charger control circuit to control the power signal incident at the charger pad from the power source.

4. The apparatus of claim 3, the RF detection circuit to detect receipt of the RF coupling signal at RF receiver contacts of an electronic device.

5. The apparatus of claim 4, wherein the RF signal source is an electronic device comprising at least one wireless transmitter.

6. The apparatus of claim 1, wherein the charger pad comprises a first contact stripe and a second contact stripe having opposite polarity to the second contact stripe, and wherein the RF filter circuit comprises a plurality of RF filters, a first one of the plurality of RF filters coupled to the first contact stripe and a second one of the plurality of RF filters coupled to the second contact stripe.

7. The apparatus of claim 1, the RF filter circuit comprising a bandpass filter.

8. A wire-free charger to provide a wireless charging signal for an electronic device, comprising:
a charger pad comprising a first electrical terminal and a second electrical terminal, the charger pad to generate a radio frequency (RF) charging signal based on an electrical potential between the first electrical terminal and the second electrical terminal;
a charger control circuit coupled to the charger pad, the charger control circuit to create the electric potential between the first electrical terminal and the second electric terminal;
an RF detection circuit to:
receive the RF charging signal; and
determine whether the RF charging signal includes a target characteristic, the target characteristic to indicate an interference of the RF charging signal with an RF signal source, the RF signal source external to the wire-free charger; and
an RF filter circuit coupled to the RF detection circuit, the RF filter circuit to modify the RF charging signal based in part on a determination that the RF charging signal includes the target characteristic to reduce the interference of the RF charging signal with the RF signal source.

9. The wire-free charger of claim 8, wherein the target characteristic includes an RF signal generated by the RF signal source.

10. The wire-free charger of claim 8, the RF detection circuit to detect receipt of the RF charging signal at RF receiver contacts of an electronic device.

11. The wire-free charger of claim 10, wherein the electronic device includes a wireless transmitter, the target characteristic to indicate interference with operation of the wireless transmitter.

12. The wire-free charger of claim 8, the RF filter circuit comprising a bandpass filter.

13. One or more non-transitory computer-readable media to store instructions that when executed by a processor circuit causes the processor circuit to:
  receive indications of a radio frequency (RF) charging signal generated by a current incident at a charger pad of a wire-free power source;
  determine whether the RF charging signal includes a target characteristic, the target characteristic to indicate an interference of the RF charging signal with an RF signal source, the RF signal source external to the wire-free power source; and
  modify the RF charging signal to alter an operational parameter of the wire-free power source based on a determination that the RF charging signal includes the target characteristic to reduce the interference of the RF charging signal with the RF signal source.

14. The one or more non-transitory computer-readable media of claim 13, wherein the target characteristic includes an RF signal generated by the RF signal source.

15. The one or more non-transitory computer-readable media of claim 13, altering the operational parameter of the wire-free power source including one or more of modifying the current incident at the charger pad, activating an RF filter circuit, and modifying the RF charging signal based on an RF noise reduction algorithm.

16. The one or more non-transitory computer-readable media of claim 13, further to store instructions that when executed by the processor circuit cause the processor circuit to generate an output signal including an indication of a suggesting to relocate, with respect to the wire-free power source, an RF signal source.

17. The one or more non-transitory computer-readable media of claim 16, the output signal comprising an audible, visual, or tactile indication.

18. The one or more non-transitory computer-readable media of claim 13, further to store instructions that when executed by the processor circuit cause the processor circuit to identify whether the RF charging signal includes the target characteristic via one or more of analyzing a level of harmonics, a modulation type, and a signal bandwidth of the RF charging signal.

\* \* \* \* \*